United States Patent [19]

Masologites

[11] 4,140,624

[45] * Feb. 20, 1979

[54] METHOD OF TREATING A USED PLATINUM GROUP-ALUMINA CATALYST WITH A METAL PROMOTER

[75] Inventor: George P. Masologites, Olympia Fields, Ill.

[73] Assignee: Atlantic Richfield Company, Philadelphia, Pa.

[ * ] Notice: The portion of the term of this patent subsequent to Jan. 24, 1995, has been disclaimed.

[21] Appl. No.: 857,076

[22] Filed: Dec. 5, 1977

Related U.S. Application Data

[63] Continuation-in-part of Ser. No. 758,965, Jan. 13, 1977, Pat. No. 4,070,306, which is a continuation-in-part of Ser. No. 315,906, Dec. 18, 1972, abandoned.

[51] Int. Cl.$^2$ .................. C10G 35/08; B01J 23/96; B01J 21/20
[52] U.S. Cl. .................. 208/140; 252/412; 252/415; 252/416; 260/668 A; 260/683.65

[58] Field of Search .................. 252/412–416, 252/466 PT, 411; 208/140

[56] References Cited

U.S. PATENT DOCUMENTS 4,070,306   1/1978   Masologites .................. 252/415

Primary Examiner—P. E. Konopka
Attorney, Agent, or Firm—Frank J. Uxa

[57] ABSTRACT

A method for preparing an improved composition of matter whereby a solid catalyst comprising alumina derived from hydrous alumina predominating in alumina trihydrates and at least one platinum group component is used in hydrocarbon conversion service for a period of time to reduce the surface area of said solid catalyst to from about 20% to about 90% of the surface area of the original solid catalyst. This decreased area solid catalyst is treated with at least one metal promoter to produce a treated catalyst having improved properties. An improved method for hydrocarbon conversion using this treated catalyst is also disclosed.

7 Claims, No Drawings

METHOD OF TREATING A USED PLATINUM GROUP-ALUMINA CATALYST WITH A METAL PROMOTER

This application is a continuation-in-part application of application, Ser. No. 758,965, filed Jan. 13, 1977 now U.S. Pat. No. 4,070,306, which, in turn, is a continuation-in-part application, Ser. No. 315,906, filed Dec. 18, 1972, now abandoned.

This invention relates to an improved method for making hydrocarbon conversion catalysts and method for using same. More particularly, the invention relates to methods for producing catalysts which have improved properties and methods for using these catalysts.

Alumina supported metal-containing catalysts have been demonstrated in the prior art to be useful for catalyzing a wide variety of chemical reactions. The reactions which are promoted by these types of catalysts include hydrocracking, isomerization, desulfurization, hydrodesulfurization, cyclyization, alkylation, polymerization, cracking, hydroisomerization and the like. Integrated processes such as hydrocarbon reforming or hydroforming, hydrocarbon hydrocracking, hydrocarbon isomerization and the like may utilize these metal-containing alumina based catalysts.

After a period of time in service, these metal-containing alumina based catalysts become deactivated and must be either replaced or regenerated. In order to reduce the frequency of such catalysts replacements or regenerations, it is desirable that these metal-containing alumina catalysts maintain reasonably high catalytic activity over a protracted period in service. In other words, the activity and/or stability of the catalysts should be maximized.

Therefore, it is an object of the present invention to provide a method for producing an improved composition of matter.

An additional object of the present invention is to provide a method for producing a catalyst having improved activity stability.

Another object of the present invention is to provide an improved hydrocarbon conversion process.

A still further object of the present invention is to provide a method for producing an alumina-based composition containing a platinum group metal and at least one additional metal for use as hydrocarbon conversion catalysts. Other objects and advantages will become apparent hereinafter.

Therefore, in one aspect of the present invention, a method has been discovered for producing an improved composition of matter comprising a major amount of alumina, at least one platinum group metal component and at least one stabilizing metal component. The method to produce the improved composition of matter comprises:

(1) contacting a solid catalyst comprising a major portion of alumina derived from hydrous alumina predominating in alumina trihydrate and a catalytically effective amount of at least one platinum group component in at least one reaction zone with hydrocarbon in the presence of hydrogen at hydrocarbon conversion conditions to chemically convert at least a portion of the hydrocarbon and form carbonaceous deposits on the solid catalyst;

(2) contacting the solid catalyst with an oxidizing atmosphere, e.g., an oxygen-containing gas, to remove at least a portion of the carbonaceous deposits and form a regenerated solid catalyst;

(3) repeating steps (1) and (2) until the surface area of the regenerated solid catalyst is reduced to from about 20% to about 90%, preferably to from about 4% to about 80%, of the surface area of the solid catalyst used in first performing step (1) to form a decreased area solid catalyst; and (4) treating said decreased area solid catalyst with at least one metal promoter to produce a treated catalyst having improved properties.

The treated catalyst prepared by the method of the present invention is useful in an improved hydrocarbon conversion, e.g., hydrocarbon reforming, process. Therefore, another aspect of the present invention is a hydrocarbon conversion process using the treated catalyst prepared as described above comprising contacting the treated catalyst with hydrocarbon in the presence of hydrogen under hydrocarbon conversion conditions to chemically convert at least a portion of the hydrocarbon.

As indicated above, the solid catalyst utilized in the present invention comprises alumina derived from hydrous alumina predominating in alumina trihydrate and at least one platinum group metal component. Considering first the alumina utilized in the solid catalyst of the present invention, it is preferred that this alumina material be a porous, adsorptive, support having a surface area of from about 25 $m^2$/gm to about 600 $m^2$/gm or more, preferably from about 350 $m^2$/gm to about 600 $m^2$/gm. The alumina comprises a major proportion, preferably at least about 80%, and more preferably at least about 90%, by weight of the catalyst. The more preferred catalyst support, or base, is an alumina derived from hydrous alumina predominating in alumina trihydrate which alumina, when formed as pellets and calcined, has an apparent bulk density of from about 0.75 gm./cc to about 0.85 gm./cc, pore volume from about 0.45 ml/gm to about 0.55 ml/gm, and surface area from about 350 $m^2$/gm to about 600 $m^2$/gm. The alumina support may contain, in addition, minor proportions of other well-known refractory inorganic oxides such as silica, zirconia, magnesia and the like. However, the most preferred support is substantially pure alumina derived from hydrous alumina predominating in alumina trihydrate.

The alumina support may be synthetically prepared in any suitable manner and may be activated prior to use by one or more treatments including drying, calcination, steaming and the like. The alumina may be macroformed into particles of any desired shape such as spheres, pills, cakes, extrudates, power, granules and the like using conventional procedures known in the art.

The support, i.e., alumina derived from hydrous alumina predominating in alumina trihydrate, may be prepared according to the methods disclosed in U.S. Pat. Nos. 2,838,444 and 2,838,445; which patents are hereby incorporated herein by reference.

As indicated above, the catalyst of the present invention also contains a catalytically effective amount of at least one platinum group metal component. The platinum group metals include platinum, palladium, rhodium, ruthenium and the like, with platinum being preferred for use in the present invention. The platinum group metal component, such as platinum, may exist within the unreduced solid catalyst at least in part as a compound such as an oxide, sulfide, halide and the like, or in the elemental state. The platinum group metal component generally comprises from about 0.05% to about 3.0%, preferably from about 0.05% to about 1.0%, by weight of the catalyst calculated on an elemental basis. Excellent results are obtained when the catalyst contains from 0.2% to about 0.9% by weight of the platinum group metal.

The platinum group component may be incorporated in the catalyst in any suitable manner, such as by coprecipitation or cogellation with the alumina support, ion-exchange with the alumina support and/or alumina hydrogen, or by the impregnation of the alumina support and/or alumina hydrogel at any stage in its preparation and either after or before calcination of the alumina hydrogel. The preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Also, the platinum group metal may be added to the support as a sulfide by comingling the uncalcined support with an aqueous solution of a water soluble platinum group metal compound and a water soluble sulfide, preferably $H_2S$. Other water-soluble compounds of platinum may be employed as impregnation solutions, including, for example, ammonium chloroplatinate and platinum chloride. It is preferred to impregnate the support with the platinum group metal when the support is in a hydrous state. Following this impregnation, the resulting impregnated support is shaped (e.g., extruded), dried and subjected to a high temperature calcination or oxidation procedure at a temperature in the range from about 700° F. to about 1500° F., preferably from about 850° F. to about 1300° F., for a period of time from about one hour to about 20 hours, preferably from about one hour to about five hours.

Certain catalysts of the present invention, e.g., a fully compounded hydrocarbon reforming catalyst, preferably include a halogen component. This combined halogen may be fluorine, chlorine and bromine and mixtures thereof with fluorine and particularly chlorine being preferred for the purposes of the present invention. The halogen may be added to the alumina particles in any suitable manner either during preparation of the macro-size particles or before or after the addition of the catalytically active platinum group metal component described previously. In any event, if the halogen is included, it is added in such a manner as to result in a fully composited catalyst that contains from about 0.1% to about 1.5%, preferably from about 0.2% to about 1.3% by weight of halogen calculated on an elemental basis.

The composition comprising at least one platinum group metal component and alumina derived from hydrous alumina predominating in alumina trihydrates prepared, for example, by a method set forth above, is generally dried at a temperature of from about 200° F. to about 600° F. for a period of from about 2 to 24 hours or more and finally calcined at a temperature of about 700° F. to about 1500° F., preferably from about 850° F. to about 1300° F. for a period of from about 1 hour to about 20 hours and preferably from about 1 hour to about 5 hours to produce the solid catalyst.

This solid catalyst is preferably subjected to reduction to insure chemical reduction of at least a portion of the platinum group metal component. Thus, prior to and/or during performance of step (1) of the above method, it is preferred to contact the solid catalyst (or regenerated solid catalyst) with a reducing medium, e.g., a hydrogen-containing gas, to chemically reduce at least a portion of the platinum group metal.

The reducing medium may be contacted with solid catalyst at a temperature of about 800° F. to about 1200° F. and at a pressure in the range from about 0 psig. to about 500 psig. and for a period of time of about 0.5 to 10 hours or more and in any event, for a time which is effective to chemically reduce at least a portion, preferably a major portion, of the platinum group metal component of the catalyst. By chemical reduction is meant the lowering of oxidation states of the metallic components below the oxidation state of the metallic component in the unreduced solid catalyst. For example, the solid catalyst may contain platinum salts in which the platinum has an oxidation state which can be lowered or even reduced to elemental platinum by contacting the unreduced catalyst with a hydrogen-containing gas. This reduction treatment is preferably performed in situ (i.e., in the reaction zone in which the catalyst is to be used), as part of the start-up operation using virgin unreduced solid catalyst or regenerated (e.g. regenerated by treatment with an oxygen-containing gas stream) solid catalyst. Also, chemical reduction of the metallic components on the catalyst may occur while step (1) of the above process is taking place. The preferred reducing medium for use in the present invention is a gas stream comprising at least a major portion (calculated on a molar basis) of hydrogen.

According to the present invention, a hydrocarbon charge stock and hydrogen are contacted with the solid catalyst of the type described above in at least one reaction zone to chemically convert at least a portion of the hydrocarbon and form carbonaceous deposits on the solid catalyst. This contacting may be accomplished by using the catalyst in a fixed bed system, a moving bed system, a fluidized bed system or in a batch type operation. However, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into at least one reaction zone containing a fixed bed of the catalyst hereinabove characterized. It is understood that the reaction system may include one or more separate reaction zones with suitable means therebetween to insure that the desired conversion temperature is maintained at the entrance to each reactor. The reactants may be contacted with the catalyst bed in either upward, downward, or radial flow fashion. In addition, the reactants may be in the liquid phase, a mixed liquid-vapor phase, or a vapor phase when they contact the catalyst, with best results obtained in the vapor phase.

When the catalysts described herein are used in a hydrocarbon reforming operation, the reforming system may comprise a reforming zone containing at least one fixed bed of the catalyst previously characterized. This reforming zone may be one or more separate reactors with suitable heating means therebetween to compensate for the net endothermic nature of the reactions that take place in each catalyst bed. The hydrocarbon feed stream that is charged to the reforming system will comprise hydrocarbon fractions containing naphthenes and paraffins that boil within the gasoline range. Typically, the hydrocarbon feed stream may comprise from about 20% to about 70% by weight of naphthenes and from about 25% to about 75% by weight of paraffins.

The preferred charge stocks are those consisting essentially of naphthenes and paraffins, although in some cases aromatics and/or olefins may also be present. When aromatics are included in the hydrocarbon charge stock, these compounds comprise from about 5% to about 25% by weight of the total hydrocarbon charge stock. A preferred class of charge stocks includes straight run gasolines, natural gasolines, synthetic gasolines and the like. On the other hand, it is frequently advantageous to charge thermally or catalytically cracked gasolines or higher boiling fractions thereof, called heavy naphthas. Mixtures of straight run and cracked gasolines can also be used to advantage. The gasoline charge stock may be a full boiling range gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of about $C_7$ to about 400° F. In some cases, it is also advantageous to charge pure hydrocarbons or mixtures of hydrocarbons that have been extracted from hydrocarbon distillates — for example, a straight-chain paraffin — which are to be converted to aromatics. It is preferred that these charge stocks be treated by conventional pretreatment methods, if necessary, to remove substantially all sulfurous and nitrogenous contaminants therefrom.

In other hydrocarbon conversion embodiments, the charge stock will be of the conventional type customarily used for the particular kind of hydrocarbon conversion being effected. For example, in an isomerization embodiment the charge stock can be a paraffinic stock rich in $C_4$ to $C_8$ normal paraffins, or a normal butane-rich stock or a n-hexane-rich stock and the like. In hydrocracking embodiments, the charge stock may be a gas oil, such as heavy straight run gas oil, heavy cracked cycle oil and the like. In addition, alkylaromatics can be conveniently isomerized by using the catalyst described herein. Likewise, pure or substantially pure, hydrocarbons can be converted to more valuable products by using the catalyst of the present invention in any of the hydrocarbon conversion processes which are promoted by a platinum group metal-containing alumina based catalyst.

In a reforming operation, an effluent stream is withdrawn from the reforming zone and passed through a condensing means to a separation zone, typically maintained at about 100° F. wherein a hydrogen-rich gas is separated from a high octane liquid product, commonly designated as a reformate. The resultant hydrogen stream is then recycled by suitable compressor means back to the reforming zone. The liquid phase from the separation zone is commonly treated in a fractionating system to adjust its butane concentration and thus control the volatility of the resulting reformate.

The conditions utilized in the numerous other hydrocarbon conversion operations within the scope of the present invention are those customarily used for the particular reaction, or combination of reactions, that is to be effected. For instance alkylaromatic hydrocarbon isomerization conditions include: a temperature of about 400° F. to about 900° F.; a pressure of from 0 psig. to about 1500 psig.; hydrogen-to-hydrocarbon mole ratio of from about 0.1:1 to about 20:1, and a weight hourly space velocity (WHSV) (calculated as weight of the hydrocarbon charge stock contacted with the catalyst per hour divided by the weight of the catalyst) of from about 0.5 to 20. Likewise, hydrocracking conditions include: a pressure of from about 500 psig. to about 3000 psig.; a temperature of from about 400° F. to about 900° F.; a WHSV of from about 0.1 to about 10; and a hydrogen circulation rate of from about 1000 to about 10,000 cubic feet per barrel of hydrocarbon charge stock.

In the reforming embodiment of the present invention, the pressure utilized is selected in the range of from about 50 psig. to about 1000 psig., with the preferred pressure being from about 100 psig. to about 600 psig. Reforming operations may be conducted at the more preferred pressure range of from about 200 psig. to about 400 psig. to achieve substantially increased catalyst life before regeneration.

For optimum reforming results, the temperature in the reaction zone should preferably be within the range of from about 700° F. to about 1100° F. more preferably in the range of from about 800° F. to about 1050° F. The initial selection of the temperature within this broad range is made primarily as a function of the desired octane of the product reformate, considering the characteristics of the charge stock and of the catalyst. The temperature may then be slowly increased during the run to compensate for the inevitable deactivation that occurs, to provide a constant octane product.

In accordance with the reforming process of the present invention sufficient hydrogen is supplied to provide from about 2.0 to about 20 moles of hydrogen per mole of hydrocarbon entering the reaction zone, with excellent results being obtained when from about 7 to about 10 moles of hydrogen are supplied per mole of hydrocarbon charge stock. Likewise, the weight hourly space velocity, i.e., WHSV, used in reforming may be in the range from about 0.5 to about 10.0 with a value in the range from about 2.0 to about 5.0 being preferred.

As noted previously, during use of the solid catalyst to promote the chemical conversion of hydrocarbons, a carbonaceous deposit forms on this catalyst. In order to remove this carbonaceous deposit from the catalyst, it is necessary to contact the solid catalyst with an oxidizing atmosphere, e.g., oxygen-containing gas and thus form a regenerated solid catalyst. Prior to the solid catalyst being contacted with an oxidizing atmosphere, the carbon content of the solid catalyst is typically above about 0.5 weight percent, often greater than about 3 weight percent. The removal of carbon from the solid catalyst may result in a substantial improvement in the catalytic activity of the solid catalyst. During the contacting with an oxidizing atmosphere, the carbon content of the solid catalyst is reduced to below about 0.5 weight percent, preferably below about 0.2 weight percent. Contacting, e.g., burning, is conducted by treating the solid catalyst with, for example, a gas containing an amount of oxygen which is controlled to maintain the temperature of the solid catalyst below about 1000° F., preferably within the temperature range of about 700° F. to about 850° F. The pressure maintained during burning is generally elevated, for instance from about 100 psig. to about 500 psig. This controlled burning is usually initiated with an inert gas-containing a small amount of oxygen, for instance up to about 1 mole percent and preferably with an oxygen partial pressure of at least about 0.2 psia. When the bulk of the carbon has been removed from the solid catalyst, by a gas-containing a relatively low concentration of oxygen, the amount of oxygen can be increased to insure that a major portion of the carbon has been removed from the catalyst without exceeding the desired temperature. This type of treatment is exemplified by one or more burn-throughs of the catalyst, particularly at about 800° F. to about 850° F. and about 100 psig. to about 500 psig. with a gas containing above about 1 to about 3 or somewhat greater mole percent oxygen. Other suitable carbon burning procedures can be employed as long as the temperatures are controlled and the carbon level of the catalyst is adequately lowered.

The regenerated solid catalyst formed by contacting the solid catalyst with an oxidizing atmosphere may be treated by additional optional procedures to, for example, replenish the halogen content lost during step 1 and/or 2 of the present method and/or to reduce the crystallite size of the platinum group metal on the regenerated solid catalyst. These procedures, for example, the method of U.S. Pat. No. 3,637,524 enhance the catalytic activity of the regenerated solid catalyst.

In any event, the regenerated solid catalyst is preferably contacted with a reducing medium, e.g., a hydrogen-containing gas, in order to chemically reduce at least a portion of the platinum group metal. This chemical reduction may take place prior to and/or during the time when the regenerated solid catalyst is used to promote the conversion of hydrocarbon as described herein above.

As noted previously, while performing steps 1 and 2 of the present method, the surface area of the catalyst is lowered. Steps 1 and 2 of the present method are repeated until the surface area of the solid catalyst is reduced to from about 20% to about 90%, preferably to from about 50% to about 80%, of the surface area of the solid catalyst used in first performing step 1 of the present method. It has been found that the decreased area solid catalyst thus formed may be treated with at least one metal promoter to produce a treated catalyst having improved properties, e.g., improved activity stability.

Included among the metal promoters which may be used in treating the decreased area solid catalyst are those components comprising rhenium, germanium and iridium. Rhenium and iridium and particularly rhenium are more preferred as promoters.

Mixtures of two or more of these promoters may also be used. These promoters are normally present in the final treated catalyst in an amount from about 0.01% to about 5%, preferably from about 0.05% to about 1% by weight calculated on an elemental basis. The treating step of the present method may be carried out in any suitable manner. For example, the procedure for treating the decreased area solid catalyst with a promoter, e.g., rhenium, may involve contacting this solid catalyst with an aqueous solution of a water soluble compound of the promoter, for example, rhenium compounds such as perrhenic acid, ammonium perrheneate and the like. Similarly, water soluble iridium compounds such as $H_2IrCl_6$ and the like, may be used. The treated catalyst may be separated from the aqueous solution and is generally dried at a temperature of from about 200° F. to about 600° F. for a period of from about 2 hours to about 24 hours or more and finally calcined, preferably in the presence of an oxygen-containing gas, at a temperature of about 700° F. to about 1500° F., preferably from about 850° F. to about 1300° F. for a period of from about 1 hour to about 20 hours and preferably for a period of from about 1 hour to about 5 hours. The treated catalyst is then contacted in a reaction zone with a hydrocarbon in the presence of hydrogen at hydrocarbon conversion conditions to chemically convert the hydrocarbon as described previously. Unexpectedly, it has been found that the treated catalyst described above has improved properties, e.g., improved activity stability relative to the original solid catalyst.

The treated catalyst having improved properties is preferably contacted with a reducing medium, e.g., hydrogen-containing gas in order to chemically reduce at least a portion of the platinum group metal and metal promoter prior to and/or during use in the conversion of hydrocarbons. The treated catalyst is contacted with a reducing medium in a manner similar to that described previously for contacting the solid catalyst with a reducing medium.

EXAMPLES 1 and 2

These examples illustrate some of the improved properties of the treated catalysts produced by the present invention.

A commercially available catalyst comprising platinum and alumina derived from hydrous alumina predominating in alumina trihydrates also selected for testing. This solid catalyst was in the form of extrudates (cylinders about 1/16 in. in diameter by ¼ in. long). This catalyst contained about 0.35% by weight of chlorine and 0.35% by weight of platinum, calculated on an elemental basis, and 3.25% by weight of volatile matter. The surface of the alumina support of this virgin solid catalyst was 429 $m^2$/gm.

A second commercially available catalyst was also tested. This solid catalyst was similar to the commercially available catalyst comprising platinum and alumina except that it contained about 0.35% by weight of rhenium and about 1.1% by weight of chlorine calculated on an elemental basis.

The commercially available platinum-alumina catalyst was employed in a hydrocarbon reforming service using a typical mid-continent naphtha feedstock at temperatures ranging from 875° F. to about 960° F., WHSV ranging from 1.8 to 2.0 and hydrogen to hydrocarbon mole ratios ranging from 6.5 to 7.5. Prior to being contacted with this hydrocarbon, the virgin solid catalyst was contacted with a hydrogen-containing gas to chemically reduce at least a portion of the platinum. After a period of time in hydrocarbon reforming, the solid catalyst was regenerated by contacting the catalyst with an oxygen-containing gas to burn off the carbonaceous deposits which had formed during the reforming service. After these carbonaceous deposits had been burned off, the catalyst was again contacted with the reducing medium, i.e., a hydrogen-containing gas, to chemically reduce at least a portion of the platinum and then put into hydrocarbon reforming service.

This procedure was continued until it was determined that the alumina base on this used catalyst had a surface area of about 236 $m^2$/gm. This used catalyst was vacuum impregnated with an aqueous solution of hydrochloric acid and perrhenic acid. The catalyst solution was allowed to stand overnight. This mixture was then dried at 230° F. for about 16 hours and calcined for 3 hours at 900° F. to form the treated catalyst. This treated catalyst contained 0.35% by weight of platinum calculated on an elemental basis, 0.35% by weight of rhenium calculated on an elemental basis and 1.15% by weight of chlorine calculated on an elemental basis at 4.08% volatile material.

The two virgin solid catalysts and the treated catalyst were performance tested in hydrocarbon reforming service (after conventional contacting with a hydrogen-containing gas to reduce at least a portion of the metallic components) using a typical mid-continent naphtha feedstock at 950° F., 4.0 WHSV and a mole ratio of hydrogen to hydrocarbon of 3. Results of these tests are as follows:

| Catalyst | Example I Platinum-Alumina Virgin Solid Catalyst | Example II Platinum-Rhenium Alumina, Virgin Solid Catalyst | Example III Treated Catalyst |
|---|---|---|---|
| Initial Research 10 Octane Number (clear) | 96.6 | 100.0 | 100.7 |
| Aging Rate, Research Octane Number per 100 hours | 5.6 | 3.7 | 2.4 |
| Standard Aging Rate* Research Octane Number per 100 hours | 8.4 | 3.7 | 2.2 |

*Based upon data correlation techniques known to give reasonable predictions of commercial catalyst aging behavior.

These results indicate a significant increase in the activity stability of the treated catalyst prepared by the process of the present invention. For example, the standard aging rate of the treated catalyst is more than 3½ times greater than the standard aging rate for the virgin catalyst comprising platinum and alumina derived from hydrous alumina predominating in alumina trihydrates.

In addition, it has been unexpectedly found that the treated catalyst is significantly more stable than is a virgin catalyst comprising platinum, rhenium and alumina derived from hydrous alumina predominating in alumina trihydrates.

EXAMPLE IV

This example illustrates the production of an improved composition containing iridium according to the present invention.

A sample of the used platinum-alumina catalyst described previously was vacuum impregnated with an aqueous solution of hydrochloric acid, ammonium hydroxide and H$_2$IrCl$_6$ having a pH of about 5.5. The catalyst solution mixture was allowed to stand overnight. This mixture was then dried at 230° F. for about 16 hours and calcined for 3 hours at 900° F. to form the treated catalyst. This treated catalyst contained 0.35% by weight of platinum calculated on an elemental basis, 0.10% by weight of iridium calculated on an elemental basis, and 1.15% by weight of chlorine calculated on an elemental basis at 3.7% by weight volatile material.

This treated catalyst was performance tested in the same manner as the catalysts of the previous examples. Test results, compared to the results from Example I, are as follows:

| Catalyst | Example I | Example IV |
|---|---|---|
| Initial Research Octane Number (clear) | 96.6 | 102.0 |
| Aging Rate, Research Octane Number per 100 hours | 5.6 | 3.1 |
| Standard Aging rate* Research Octane Number per 100 hours | 8.4 | 2.4 |

*Based upon data correlation techniques known to give reasonable predictions of commercial catalyst aging behavior.

These results show clearly the superior activity stability of a catalyst containing platinum and iridium prepared according to the present invention relative to a commercially available platinum-alumina catalyst.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process for converting hydrocarbons in at least one reaction zone which comprises contacting a solid catalyst in said reaction zone with hydrocarbon in the presence of hydrogen at hydrocarbon conversion conditions to chemically convert at least a portion of said hydrocarbon, the improvement wherein said solid catalyst is produced by a method comprising:
   (1) contacting a catalyst comprising a major portion of alumina derived from hydrous alumina predominating in alumina trihydrate and a catalytically effective amount of about 0.05% to about 3.0% by weight of at least one platinum group metal component in a reaction zone with a hydrocarbon in the presence of hydrogen at hydrocarbon conversion conditions to chemically convert said hydrocarbon and form carbonaceous deposits on said solid catalyst;
   (2) contacting said catalyst with an oxygen-containing gas to remove at least a portion of said carbonaceous deposits and form a regenerated catalyst;
   (3) repeating steps (1) and (2) until the surface area of the regenerated catalyst is reduced to from about 20% to about 90% of the surface area of the solid catalyst used in first performing step (1) to form a decreased area catalyst; and
   (4) treating said decreased area solid catalyst with a rhenium component to produce a treated catalyst containing about 0.01% to about 5% by weight of said rhenium calculated on an elemental basis having improved catalytic activity stability relative to said catalyst first used in step (1).

2. The process of claim 1 wherein said treated catalyst comprises from about 0.05% to about 3.0% by weight of at least one platinum group metal calculated on an elemental basis, and from about 0.1% to about 1.5% by weight of at least one halogen calculated on an elemental basis.

3. The process of claim 2 wherein steps (1) and (2) are repeated until the surface area of the regenerated catalyst is reduced to from about 40% to about 80% of the surface area of the catalyst used in first performing step (1) to form a decreased area catalyst.

4. The process of claim 3 wherein said hydrocarbon conversion comprises hydrocarbon reforming.

5. The process of claim 4 wherein said platinum group metal is platinum and said halogen is chlorine.

6. The process of claim 1 wherein step (4) comprises:
   A. contacting said decreased area catalyst with an aqueous solution comprising at least one water-soluble compound of said rhenium to add at least a portion of said rhenium to said decreased area catalyst; and B. calcining said decreased area catalyst to form said treated catalyst.

7. The process of claim 5 wherein step (4) comprises:

A. contacting said decreased area catalyst with an aqueous solution comprising at least one water-soluble compound of said rhenium to add at least a portion of said rhenium to said decreased area catalyst; and B. calcining said decreased area catalyst in the presence of an oxygen-containing gas to form said treated catalyst.

* * * * *